United States Patent [19]
Greenberg

[11] Patent Number: 4,948,489
[45] Date of Patent: Aug. 14, 1990

[54] ELECTROLYTIC TREATMENT APPARATUS

[75] Inventor: Bernard Greenberg, Brooklyn, N.Y.

[73] Assignee: Environmetal Recovery Systems, Inc., New York, N.Y.

[21] Appl. No.: 340,604

[22] Filed: Apr. 19, 1989

[51] Int. Cl.$^5$ .................. C25B 15/08; C25B 9/00; C25B 11/04; C25B 15/02

[52] U.S. Cl. .................. 204/228; 204/232; 204/240; 204/257; 204/264; 204/293

[58] Field of Search ........ 204/149, 152, 240, 263-266, 204/228, 252-258, 293, 238, 232

[56] References Cited

U.S. PATENT DOCUMENTS

| | | | |
|---|---|---|---|
| 3,943,044 | 3/1976 | Fenn, III et al. | 204/152 X |
| 3,975,247 | 8/1976 | Stralser | 204/152 |
| 4,053,386 | 10/1977 | Schmidt | 204/264 |
| 4,367,132 | 1/1983 | Bell et al. | 204/152 X |
| 4,384,937 | 5/1983 | Shuster et al. | 204/237 |
| 4,572,774 | 2/1986 | Wrighton et al. | 204/238 |
| 4,613,415 | 9/1986 | Wreath et al. | 204/264 X |
| 4,702,806 | 10/1987 | Miller et al. | 204/264 X |

Primary Examiner—Donald R. Valentine
Attorney, Agent, or Firm—Kirkpatrick & Lockhart

[57] ABSTRACT

An electrolytic treatment method and a unit in which such a method is practiced are provided wherein heavy metal hydrous oxides are precipitated and recovered from a dilute waste stream to render the waste stream suitable for discharge. The waste stream is passed into the cathode chamber of an anion exchange membrane delineated electrolytic cell and subjected to high current density electrolysis to promote the formation of regular, noncompressible metal hydrous oxide crystals. Fluoride ion is added to the precipitate-containing waste stream, the precipitate is filtered and the clarified liquid waste stream is split so that a portion is discharged and a portion is recycled into the metal ion-containing waste stream for further treatment.

9 Claims, 2 Drawing Sheets

ELECTROLYTIC TREATMENT APPARATUS

BACKGROUND OF THE INVENTION

1. Field of the Invention

The present invention relates generally to techniques for recovering the heavy metal constituents from the waste stream of certain metal finishing operations, and more particularly, to a novel means of precipitating such metals as hydrous oxides.

2. Description of the Prior Art

The ideal water pollution control technique for metal finishing operations, such as electroplating, aluminum anodizing or conversion coating, would be one which is simultaneously a recovery technique. Most often, pollution control techniques (those which render the effluent in compliance with discharge regulations) are quite different from recovery techniques and the two terms have, in practice, come to be understood as mutually exclusionary. Present state-of-the-art compliance technology results in a grossly contaminated metal-containing product which is unsuitable for simple recovery of the heavy metal constituents. This is due to the incorporation of additional chemical agents for purposes of rendering the effluent in compliance with applicable discharge regulations without regard to the recoverability of the heavy metal constituents. However, recent changes in EPA solid waste disposal regulations have compelled the user to implement recovery procedures. Recovery techniques require supplementary technology to assure that the by-product of recovery is in compliance with applicable discharge regulations. However, even the best of recovery techniques does not yield a recovery product easily suitable for reintroduction into the process bath.

Evaporation of process rinsewaters was implemented by industry as a solution to the combined compliance and recovery problem. It was thought that by simply removing the water, the contaminated waste could then be reintroduced into the process bath. Many factors, however, proved to work against this technique. Energy requirements proved too high, air pollution problems abounded, degradation of sensitive bath components developed, and the impurities resident in both bath and raw rinsewater concentrated themselves, often presenting a poisoning threat to the bath.

The predominant recovery techniques of reverse osmosis and ion exchange fall far short of being sufficiently discriminatory to exclude the resident impurities in the process bath. Reintroduction of the permeate or column eluate concentrates the impurities anew. Eventually a point of intolerance is reached whereby the process must be shut down and purification undertaken.

Precipitation as a hydrous oxide is highly advantageous from a cost perspective but it does not provide the proper means of generating a crystalline solid. A severe limitation to the precipitation of principal heavy metals as hydrous oxides is that the zone of metastable precipitation is virtually nonexistent. Precipitation cannot therefore be effected from homogeneous solution and as a result, hydrous oxide precipitates are difficult to filter and highly impure. One of the most common yet ineffective means of generating pure and dense hydrous oxides is to add strong caustic soda (sodium hydroxide) solution to a solution of the heavy metal. The requirements of volume minimization dictate that a concentrated caustic soda feed be employed. Typically, 50% solutions of this substance are employed for this purpose. Yet addition of such a concentrated sodium hydroxide solution generates hydrous oxide nuclei so rapidly that the precipitates have highly disadvantageous qualities. Customary attempts to render these precipitates well behaved by the use of flocculants only serves to contaminate the product and make the hydrous oxide unsuitable for facile recovery. The use of commercial grade caustic soda also introduces impurities into the system which accumulate in the harvested hydrous oxide.

The ideal technique for pollution control would be a technique which would recover all bath components in a facile manner. Such a technique is unachievable due to the differing nature of the components of the production bath, requiring the employment of highly distinct recovery processes. However, a compliance technique which would enable simultaneous facile recovery of the principal heavy metal bath components, if commercially available, would be of significant value. An object of the present invention is to provide such a technique. A further object of the present invention is to provide a technique for precipitating such heavy metals in an easily handled and filterable form without the introduction of chemical agents which can introduce impurities into the harvested metals. Another object of the present invention is to provide a technique which promotes the formation of crystals in regular form and at a rate which excludes occluded impurities.

SUMMARY OF THE INVENTION

The key to the development of a method ensuring both compliance with discharge regulations and simultaneous recovery of the principal heavy metal bath components utilizes the techniques of crystalline solid separation. The formation of a crystalline solid is an exclusionary process and therefore provides the necessary basis for discriminating against impurity inclusion. The method of the present invention couples a filtration technique with a precipitation technique to promote the formation of a dense, regular, noncompressible crystalline precipitate.

A technical scheme and preferred embodiment have been developed which overcome the above drawbacks to the recovery of a pure and filterable hydrous oxide. The method may also be used to recover pure basic salts, such as in a zinc phosphate solution.

The present invention provides a method for recovering metal from a waste stream to render the waste stream suitable for discharge. The method includes the step of passing a waste stream comprised of heavy metal salts in dilute solution into the cathode chamber of an anion exchange membrane delineated electrolytic cell, wherein the metals are selected from the group having a standard reduction potential more negative than that of hydrogen in the electromotive force (emf) series and the heavy metal ion concentration of the solution is less than about 10,000 parts per million of dissolved material. The method further includes the steps of subjecting the waste stream to high current density electrolysis at up to about 25 volts to enhance the controlled regular formation of a noncompressible metal hydrous oxide crystalline precipitate in the cathode chamber, adding an effective amount of fluoride ion to the precipitate-containing waste stream to prevent the formation of filter blocking compounds, filtering the precipitate from the waste stream and splitting the clarified liquid waste stream so that a portion of the clarified liquid waste stream is discharged and a portion is returned downstream for commingling with the metal ion-containing waste stream for further treatment.

Fluoride ion may be added by dissolving sodium fluoride (NaF) in the precipitate-containing waste stream. The effective amount of the fluoride ion is preferably a concentration of about 0.01 to 0.1 molar. Higher concentrations are economically prohibitive.

The filtering step preferably includes filtering the precipitate-containing waste stream through a filter membrane made of a porous tetrafluoroethylene polymeric material to separate the precipitate from the waste stream. The precipitate-containing waste stream is preferably pumped through the filter membrane at a pressure up to about 100 psi, and preferably, at about 50 psi.

In order to prevent acid build-up in the anode chamber, selective amounts of a basic electrolyte, such as soda ash, may be introduced into the anode chamber of the electrolytic cell to maintain the desired alkalinity.

The present invention also provides an electrolytic treatment unit which includes an electrolytic cell having a cathode chamber and an anode chamber separated by an anion exchange membrane, means for applying electric current to the electrolytic cell, a holding compartment fluidly connected to the cathode chamber and a filter chamber fluidly connected to the holding compartment. The filter chamber has a filter membrane made of a porous tetrafluoroethylene polymeric material which divides the filter chamber into a precipitate collection zone and a clarified liquid zone. The treatment unit also includes a clarified liquid collection chamber having an inlet fluidly connected to the clarified liquid zone of the filter chamber, an outlet for discharging clarified liquid and an overflow weir surrounding the outlet. Pump means are provided for directing the flow of unfiltered liquid from the holding compartment to the filter chamber and through the filter membrane at a predetermined pressure.

The treatment unit preferably also includes means for back-pulsing liquid through the filter membrane. Means may also be provided for injecting agents, such as acid, into the filter chamber for clearing the filter membrane of blocking compounds, such as calcium carbonate or ferric hydroxide.

The clarified liquid collection chamber preferably includes a second outlet fluidly connected to the holding compartment. In this embodiment, the treatment unit further includes means, such as a baffle, to prevent unfiltered liquid from entering the collection chamber from the holding compartment. The treatment unit may further include means for measuring the pH of the clarified liquid in the collection chamber and for communicating the pH measurements thus obtained to a rectifier for automatically controlling the amount of current applied to the electrolytic cell.

BRIEF DESCRIPTION OF THE DRAWINGS

The present invention can be better understood by reference to the drawings in which.

DETAILED DESCRIPTION OF THE PREFERRED EMBODIMENTS

Figure 1:
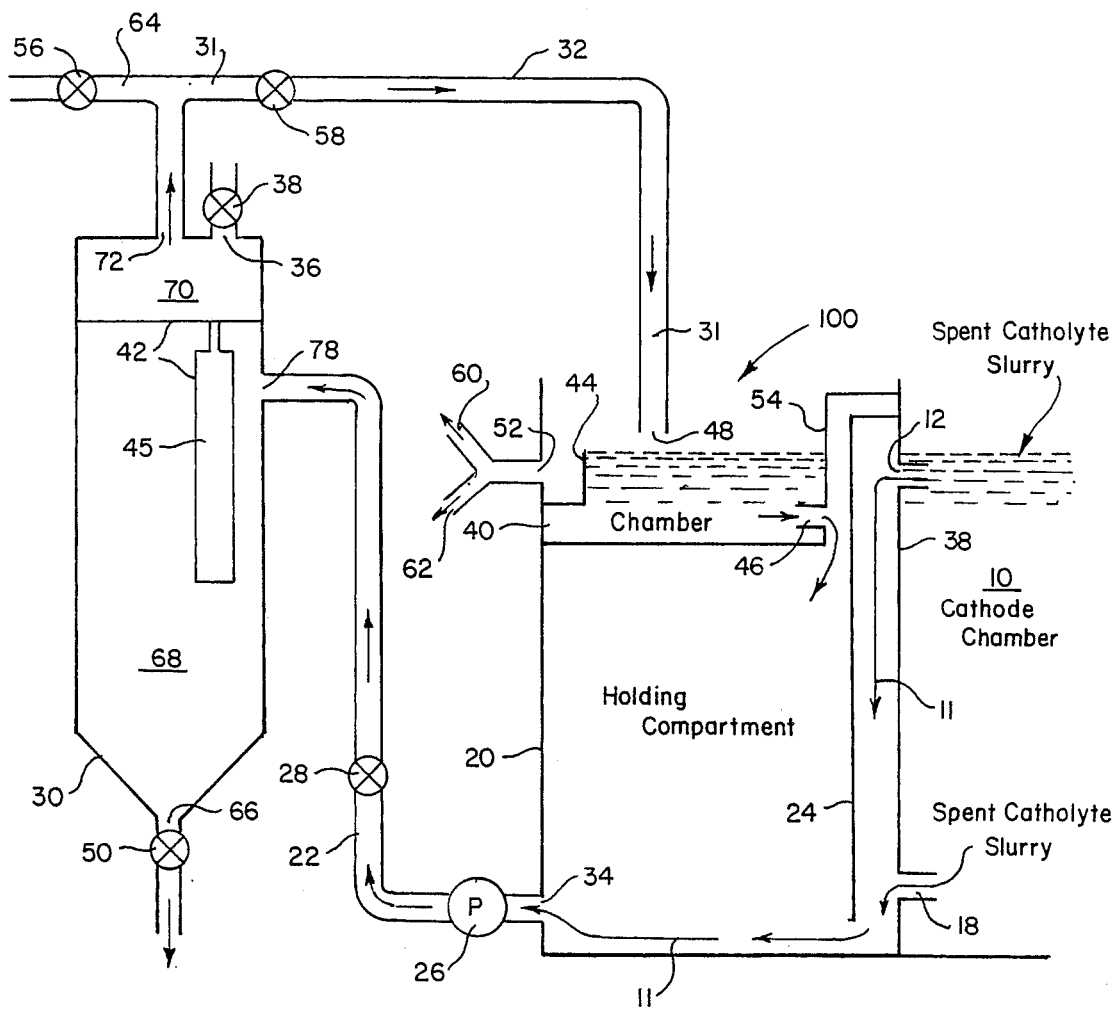
FIG. 1 is a schematic illustration of a preferred embodiment of the electrolytic treatment unit of the present invention.

All heavy metal hydrous oxides (hydroxides) have limited solubility. As such, in the absence of typical chelating agents, the formation of a hydrous oxide offers the user a convenient means of precipitating typical metal ions which are commonly in technologic use but whose discharge into the environment may not be permitted. Examples of such usage are frequently encountered in, though not limited to, the metal finishing industry. Electroplating operations, aluminum anodizing operations, conversion coating operations and other activities which generate waste streams containing heavy metal salts and heavy metal ions in dilute solution will benefit from the treatment method and treatment unit of the present invention. The heavy metals which may be recovered by the method of the present invention are those having a standard reduction potential more negative than the reduction potential of hydrogen in the emf series. Examples are nickel, aluminum, lead, tin, cadmium and zinc. A particularly attractive feature of precipitating such metals in this fashion is that the hydrous oxides may be readily converted to any desired salt by the addition of the proper free acid whereby no other ionic residues are simultaneously produced.

The electrolytic treatment unit 100 of the present invention is illustrated in FIGS. 1–4. The treatment unit 100 includes generally an electrolytic cell 14, a holding compartment 20, a filter chamber 30, and a clarified liquid collection chamber 40. The treatment unit 100 is suitable for on-line fluid connection with the waste stream of a metal finishing operation.

The electrolytic cell 14 includes at least one cathode chamber 10 (two are shown in the embodiment illustrated in FIGS. 3 and 4) and at least one anode chamber 16. Each cathode chamber 10 includes an upper port 12 and a lower port 18 fluidly connecting the cathode chambers 10 of the electrolytic cell 14 to the holding compartment 20. The anode and cathode chambers are separated by an anion exchange membrane 76. Any suitable known anion exchange membrane will suffice. Sybron and MA 3475 have been found to be acceptable. Suitable known means are provided to apply current to the electrolytic cell.

The holding compartment 20 includes an outlet 34 near the bottom of the compartment leading to inlet 78 of filter chamber 30 through piping 22. A baffle 24 is provided adjacent ports 12 and 18 to prevent unfiltered liquid from entering the clarified liquid collection chamber 40. A centrifugal pump 26 in piping 22 creates a current 11 which draws liquid toward outlet 34 and filter chamber 30. The pump 26 generates a pressure of up to about 100 psi, but preferably about 50 psi.

The filter chamber 30 must be constructed to withstand the pressure generated by pump 26. Because the cost of such construction increases significantly for pressures above about 50 psi, the preferred pressure is at or below about 50 psi. The filter chamber 30 includes a filter membrane 42 which divides the filter chamber 30 into a precipitate collection zone 68 and a clarified liquid collection zone 70. An outlet 66 in the precipitate collection zone 68 is fitted with a valve 50. An outlet 72 in the clarified liquid collection zone 70 fluidly connects the filter chamber 30 via piping 32 to the clarified liquid collection chamber 40 atop the holding compartment 20.

The piping forms a T at the outlet 72. Valves 56 and 58 are positioned in each arm 64 and 32, respectively, of the T. An inlet 36 with a valve 38 is provided in the clarified liquid collection zone 70 of filter chamber 30 to permit the introduction of chemical agents, such as an acid, for clearing blocking compounds, such as calcium carbonate or ferric hydroxide from the filter membrane 42.

The filter membrane 42 is made of a porous polytetrafluorethylene (PTFE) polymeric material, sold commercially under the trademark Goretex®. Goretex® is an expanded PTFE on a polypropylene felt support medium. In the preferred embodiment, the Goretex® filter membrane is arranged in cylindrical units grouped together in a bundle 45.

Clarified liquid 31 flows through filter membrane 42 and the precipitate settles in the bottom of precipitate collection zone 68 for eventual passage through outlet 66 when valve 50 is opened for recovery of the precipitate. The clarified liquid 31 flows through outlet 72 along piping 32 (when valve 58 is opened and valve 56 is closed) to inlet 48 of the clarified liquid collection chamber 40.

Figure 2:
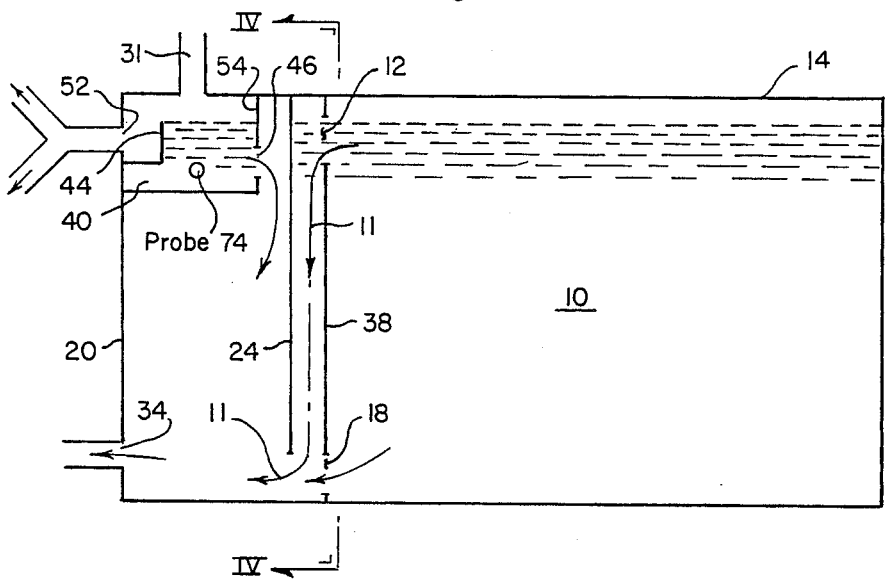
FIG. 2 is a schematic illustration of the electrolytic cell and holding compartment of the treatment unit of FIG. 1.
Figure 3:
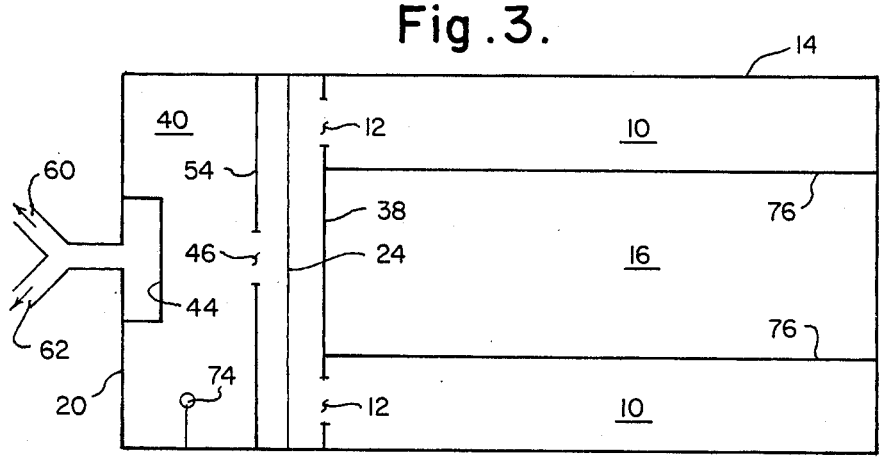
FIG. 3 is a top plan view of the illustration of FIG. 2.
Figure 4:
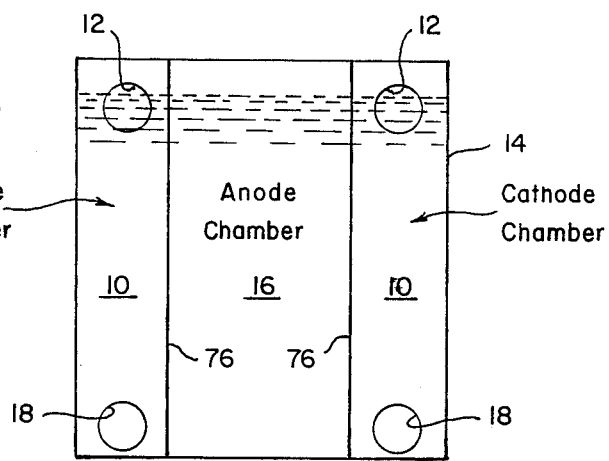
FIG. 4 is a sectional view of the illustration of FIG. 2 along the line IV—IV.

The collection chamber 40 is preferably situated atop holding compartment 20, as shown in FIGS. 1 and 2, but may be a separate structure spaced from holding compartment 20. An outlet 52 permits clarified liquid 31 which flows over weir 44 to be discharged to path 62 for return to the rinsing system where the clarified liquid is combined with an equivalent input of fresh water, and to path 60 for use in any suitable rinsing capacity, for example, as a rinse after pickling prior to plating.

A second outlet 46 is provided in end wall 54 of collection chamber 40 to fluidly connect the collection chamber 40 to the holding compartment 20. The baffle 24 is positioned to prevent the flow of unfiltered waste stream from entering the collection chamber 40. In addition, the current 11 created by pump 26 draws fluid away from collection chamber 40. The weir 44 and the end wall 54 of collection chamber 20 are configured to maintain a head of clarified liquid in sufficient volume so that only an excess will flow over weir 44 to ensure the discharge of only clarified liquid to outlet 52 while the filtrate is being recycled.

Part of the flow of clarified liquid from filter chamber 30 makes a loop circuit from the collection chamber 40 through the second outlet 46 downward into the holding compartment 20 and again through piping 22 to filter chamber 30 for another pass through filter membrane 42.

A pH probe 74 is positioned in collection chamber 40 to measure the pH of the clarified liquid. The pH signal is used to control the DC power applied to the electrolytic cell 14. The probe 74 is connected to a conventional pH readout device which provides a 4 to 20 milliamp output signal. The pH readout device is in turn connected to a silicon controlled rectifier which automatically raises and lowers the current applied to the electrolytic cell 14 in response to the signal changes measured in the clarified liquid 31 within collection chamber 40.

An electrolytic cell has reduction taking place at the cathode and oxidation taking place at the anode. At the cathode, electrons are forced into the electrolyte. If the electrolyte is dilute with respect to the metal to be precipitated, the water molecules will almost entirely be the species in contact with the cathode and it will be the water molecules which will be reduced so long as the metal in question is thermodynamically more difficult to reduce than the water. As the process proceeds, the pH rises gradually, and any metal ions will begin to precipitate as nuclei of metal hydrous oxide. These nuclei will grow in an orderly fashion as the pH rises more.

Typical rinsewaters from industrial processing, such as encountered in the metal finishing industry, are often quite dilute and contain 100 to 10,000 ppm of the process metal. Dilute solution, as used herein, will refer to a solution having a heavy metal ion concentration of less than about 10,000 parts per million of dissolved material. When such a stream is subjected to DC electrolysis at high voltages (up to about 25 volts), the metal is not reduced at the cathode. Hydrogen gas is deposited preferentially to the deposition of the metal. The species which is to be electro-reduced is controlled by the rate of diffusion into the cathode-solution interface. That is, in a dilute solution subjected to high current density (and high voltage) electrolysis, the heavy metal ions cannot diffuse into the cathode-solution interface rapidly enough, thereby making the deposition of hydrogen gas more facile.

The electrode process for this cathodic reaction is given as $$2H_2O + 2e^- = H_2(g) + 2OH^- \tag{1}$$

Hydroxyl ion is produced and the pH in the vicinity of the cathode rises. Of course, a corresponding anode process must take place [Eq. (2)].

$$H_2O = 1/2 O_2(g) + 2H^+ + 2e^- \tag{2}$$

Here, oxygen gas is deposited and the pH is lowered with the production of hydrogen ions. Were the water soluble products of these two reactions [Eq. (1) and Eq. (2)] allowed to commingle, the net effect on the solution would be voided.

However, if the two electrodes are separated by a membrane, the pH changes produced at the anode and cathode can be maintained. If a heavy metal salt were present at low concentration in the cathode chamber of such an electrolytic cell, the changes which are described in equations (3) and (4) below are observed to occur, provided that the delineating membrane is of the anion exchange type.

$$M^{n+} + nOH^- = M(OH)_n \tag{3}$$

$$X^{n-}(cath) \rightarrow X^{n-}(anod) \tag{4}$$

Thus, if a heavy metal salt in dilute solution is introduced to the cathode chamber of an anion exchange membrane delineated electrolytic cell, the hydrous oxide is formed and the anion of the original salt is dialysed into the anode chamber.

The fundamental chemical concept of the present invention is that of a diffusion controlled electrolysis of a dilute solution of a heavy metal with a standard reduction potential more negative than that of hydrogen in the emf series. The ancillary concept of separating the anode and cathode chamber by an anion exchange membrane allows the dialysis of the anion of the metal salt and conserves as much alkalinity in the cathode chamber as possible. There are a number of problems, however, in the practical implementation of these concepts which the treatment method and treatment unit of the present invention overcome.

The method of the present invention may be practiced in the treatment unit 100 described above. The preferred method of recovering metals from a waste stream to render the waste stream suitable for discharge as practiced in treatment unit 100 includes introducing the metal ion-containing waste stream into the cathode chamber 10 of electrolytic cell 14. As stated above the waste stream is comprised of heavy metal salts in dilute solution. The heavy metal ion concentration of the solution is less than about 10,000 parts per million of dissolved material. The heavy metals are themselves difficult to reduce and are not present in high concentrations. Both of these factors tend to favor deposition of hydrogen over the metal constituents. The waste stream in cathode chamber 10 is subjected to high current density electrolysis at up to about 25 volts, and preferably between 20–25 volts. Current above 25 volts results in resistance heating and dissipation of power. The voltage is higher than that used in conventional systems. The higher voltage speeds up electrolysis so that the metals are further prevented from depositing on the cathode. The deposition of hydrogen yields hydroxyl ions for reaction with the metal ions and the resultant precipitation of the metal hydrous oxide. Precipitation is slow so that crystals are regularly formed. It is believed that the nuclei of the crystals are grown at a slower rate than new crystals are created so that occluded impurities are excluded. A regular, noncompressible, crystalline precipitate of metal hydrous oxide without occluded impurities is thus formed.

With the microcrystalline particles of metal hydroxide developed, the metal is now in suspension rather than in solution, as was the case before electrolysis. Removal of these suspended particles must now be effected on a continuous basis because the treated wastewater is continuously being displaced from the treatment unit by the injection of untreated liquid.

Preferably a basic electrolyte, such as soda ash, is added in selective amounts to the anode chamber 16 to maintain the desired alkalinity of the anode chamber. The introduction of a basic electrolyte into the anode chamber is dictated by the fact that if the acid concentration of the anode chamber gets too high, then hydroxyl ion will unfavorably migrate across the ion exchange membrane and be neutralized. Typically, soda ash, or sodium carbonate, can be added to the anode chamber; this material will maintain an adequate alkalinity therein without the danger of destroying the anion exchange membrane, which caustic soda is prone to doing. Although the method of the present invention can proceed without the addition of the basic electrolyte to the anode chamber, the effective life of the method would be very short. Thus, for practical purposes, the addition of the basic electrolyte to the anode chamber is highly desirable.

Following electrolysis the precipitate-containing waste stream is passed through ports 12 and 18 to holding compartment 20 where it is drawn through outlet 34 by centrifugal pump 26, along piping 22 through open valve 28 to inlet 78 of the filter chamber 30. After electrolysis but before being filtered, an effective amount of fluoride ion is added to the precipitate-containing waste stream. The fluoride ion may be added as sodium fluoride suspended in a guaze bag in holding compartment 20. Very small concentrations of fluoride ion, in the range of 0.01 to 0.1 M, will be effective to prevent the formation of filter blocking compounds such as calcium carbonate and ferric hydroxide. The solubility of sodium fluoride is only 40 g/liter at ambient temperature and the restricted surface presented by the dissolving bag of 10–15 lbs. capacity is sufficient to maintain a concentration near the 0.01 M fluoride concentration that is desired.

The pressure from pump 26 forces the stream through filter membrane 42. The precipitate falls to the bottom of the precipitate collection zone 68 and clarified liquid, or filtered waste stream 31, leaves through outlet 70 along piping 32 through open valve 58 (valve 56 is closed) to inlet 48 of the clarified liquid collection chamber 40.

The clarified liquid waste stream fills collection chamber 40 and the overflow over weir 44 is discharged from outlet 52 to path 60 and path 62 where it is split so that a portion is discharged for any desired purpose and a portion is returned downstream to the metal finishing operation for commingling with a metal ion-containing stream for further treatment.

Of great significance is the problem of low conductivity encountered with plating rinses. Since the amount of treatment is directly proportional to the quantity of current passed, the cost of electric power is the most important cost associated with this type of treatment. One must also avoid making these units very large so as to minimize the effects of low catholyte conductivity. The most cost effective means of achieving this end is to recirculate spent catholyte which has been stripped of its nickel content through the nickel plating rinse system in the production area of a typical installation.

Plating baths generally contain conductivity enhancing salts which are not otherwise associated with metal deposition. These salts are not removed in the precipitation of the metal hydrous oxide, so by recycling a portion of the treated rinse to the rinsing system, conductivity is enhanced and the cost of both operation and construction of the treatment system are reduced. Another benefit is that the spent catholyte is typically at elevated pH on discharge from the treatment unit. By recirculating half of this flow back into the metal ion containing rinsing system, the pH of the plating rinse is elevated sufficiently so that less electrolysis has to be carried out.

As an example, consider a nickel plating operation using 5 gpm (gallons per minute) of rinsewater after electroplate. Typically, the pH of the rinse is 4.2 to 4.5. In order to precipitate the nickel sufficiently to be in conformity with regulations, the unit must be capable of raising the pH to the vicinity of 9.0. In order to raise the pH of the raw rinse from roughly 4 to 9, about 15 amp-secs per gallon of rinse are required. By combining half of the treated rinse flow out of the unit, with a halved flow of fresh rinsewater, the requirements for treatment are dropped considerably. Nickel sulfate solutions do not begin to precipitate nickel hydrous oxide until pH 6.5. By combining a flow of 2.5 gpm out of the treatment unit with a flow of 2.5 gpm of fresh water to form the 5 gpm of total flow into the plating rinse system, the pH can be raised to the threshold of 6.5 and the current requirements for treatment then drop to 5 amp-secs per gallon of rinse. Additionally, the inclusion of salt-containing liquid in the rinse reduces the composite resistance of the treatment unit (solution and membrane) to 1.5 ohms/ft$^2$ from 3.0 ohms/ft$^2$. This reduces the needed applied voltage by one-half and reduces power costs by the same percentage. The consumption of water for the production system is also reduced by 50%.

To summarize the foregoing, a practical essential to the application of this type of treatment is that the treated discharge from the unit is split in half. One-half of this output is then combined with an equivalent input of fresh water. The other half of the output from the treatment unit may be used in any suitable rinsing capacity, for example, as a rinse after pickling prior to plating. Without this apportionment of flows, the costs of construction and operation of this type of unit can be prohibitive.

The pertinent data from two operating examples of the method of the present invention are set forth below:

EXAMPLE 1: NICKEL TREATMENT SYSTEM

Unit size: 6 ft. long ×5 ft. high with four (4) 6, ×5, cathodes in three (3) compartments.
Waste inflow: 5–7 gpm with Ni content 800–3900 ppm
pH at which DC power is cut off: 9.6
Filter size: 35 ft$^2$ Goretex ® membrane
Filter flow rate: 10–50 gpm
Max. DC current: 2000 Amps
Average current (DC): 1100 Amps
Observed pH variation of effluent: 8.2–9.6
Ni content of effluent: 2.6–0.8 ppm

EXAMPLE 2: ZINC PHOSPHATE TREATMENT SYSTEM

Unit size: 8 ft. long×5 ft. high with two (2) 8'×5' cathodes in three (3) compartments.
Waste inflow: 4–10 gpm with Zn content 1000–5000 ppm
pH at which DC power is cut off: 8.6
Filter size: 42 ft$^2$ Goretex ® membrane
Filter flow rate: 12–60 gpm
Max. DC current: 1000 Amps
Average current (DC): 600 Amps
Observed pH variation of effluent: 7.9–8.6
Zn content of effluent: 0.2–0.005 ppm A particularly vexing problem is that of the composition of the anode used in the electrolysis. This method is particularly appropriate for the treatment of bright nickel electroplating rinses which contain appreciable concentrations of nickel chloride. The dialysis of the chloride ion into the anode chamber will inevitably mean that nascent chlorine will present itself at the anode surface. The anode must then be capable of withstanding one of the most attritive conditions encountered in chemical technology. The maintenance of alkaline conditions in the anode chamber only slightly mitigates this condition. Dimensionally stable anodes of platinized titanium or platinized colombium cannot be used because the potential of electrolysis exceeds the breakdown value of these composites. Platinized tantalum and platinum itself would function well but are too expensive for practical consideration in a commercial scale operation. Graphite is too readily attacked as are a host of stainless steels which are commercially available. Lead dioxide compositions are environmentally unusable. It has been found that an alloy of high-silicon iron of a type produced by Duriron Co. and generally sold as acid resistant piping material is entirely acceptable for use as an anode in the treatment method of the present invention. The composition of this material is 14% silicon with the remainder being iron. While there is some attrition of this material, the products are environmentally safe. The rate of breakdown is significantly below graphite and typical stainless steels of the 200, 300 or 400 series.

The most formidable problem associated with the operation of a treatment system of this type is the means of removal of the hydrous oxide (or basic salt) produced by subjecting the metal salt-containing rinse to the action of the cathode. The feasibility of having a small filtering system of an automatic type is made possible by the nature of the solid produced by the cathode electrolysis. Since the inflow to the system is not of constant pollutional load, in that metal concentrations may vary considerably with time owing to changing system requirements, the filter must have a very short purge cycle time when the system is subjected to a heavy load. Additionally, since the output of filtrate from a filter depends upon the amount of accumulated solids on the filter medium during a filtration cycle, the minimum rate of filtration must always be greater that the flow into the treatment system. If this is not the case, then unfiltered hydrous oxide or basic salt may carry over into the effluent and prevent compliance with applicable discharge requirements.

In order to prevent solid hydrous oxide contamination of the effluent, a system of filter and filtrate ballast has been developed by the present invention. This system deals with a number of contingencies which are inherent in the process of filtration.

In prior art systems, if a filter is constructed to harvest solids, then the rate of throughput will decrease with the thickness of the layer of solids which is accumulating. At a certain point during the filtration operation, the process must be stopped and the filter "cake" removed so that unimpeded flow can be reestablished. It has been substantiated that a "back-pulse" filter using filter membrane 42 made of Goretex ® as described above is preferred in the method of the present invention. Slurry is fed into the filter chamber 30 and the solids are deposited on the exterior surface of the cylindrical elements of membrane 42, with the filtrate passing into the cavity of the cylinders 45 and thence out of the filter. Periodically, the process is reversed for a short back-pulse to purge the membrane 42 of the solids. The back-pulse filter operates in a conventional manner. Valves 28 and 58 are closed. Pump 26 is turned off. Valve 56 is opened. Cold fresh water is introduced from a source through piping 64 and outlet 72 into filter chamber 30. The water flows through filter membrane 42 to clear any caked precipitate from the filter membrane 42. The use of a porous polytetrafluoroethylene membrane is a requirement as its surface has the lowest adhesional characteristics of any known substance. This almost assures release of the filter "cake". These solids are periodically removed from the bottom of the filter chamber 30 by opening valve 50 and "dumping" through outlet 66.

The operation of a back-pulse filter of this type has heretofore been effected under the premise that the back-pulse pressure must always exceed the pressure of the original filtration since the "cake" could not otherwise be expected to be pulsed off. With the solids generated in the treatment unit and method of the present invention, this does not appear to be the case. As a result, back-pulse pressure need not exceed filtration pressure. Since the use of high back-pulse pressures have been deemed to destroy the Goretex ® membrane lamination, low filtration pressure has always been used. This means low throughput rates. In the present invention, however, filtration pressures can be as high as 100 psi, or seven times the recommended maximum, greatly enhancing the throughput rate and greatly reducing the size and cost of such filters.

Finally, the nature of the ballast system which is needed to prevent discharge of precipitated solids during the back-pulse cycle must be explained. If a system of this sort is operating continuously, and the filter goes into a back-pulse cycle, a ballast of clarified liquid, or filtrate, must be kept in the collection chamber 40 behind weir 44 so that no discharge of solids is realized during the back-pulse phase.

A problem which may be encountered with this type of filter medium (Goretex ®) is that it tends to deposit calcium carbonate on its surface while standing dormant (during downtime). This is the result of the requisite basification of rinsewater in order to precipitate the metal hydrous oxide or basic salt. The following equation, $$2OH^- + Ca(HO_3)_2 \rightarrow CaCO_3 + CO_3^{2-} + H_2O. \quad (5)$$

means that resident hardness in the raw rinsewater is converted to calcium carbonate. This calcium carbonate then tends to grow on the surface of the filter membrane 42, occluding the sub-micron pores of the medium. It has been found that the inclusion of small amounts of fluoride ion (as sodium fluoride) in the waste stream to be filtered will prevent the formation of calcium carbonate. Fluorite ($CaF_2$) forms preferentially and has a crystalline structure which is such that the fluorite does not occlude the surface. The addition of fluoride ion to the filtration stream has the advantageous effect of rendering any ferric ion soluble. Were this not done, ferric hydrous oxide might accumulate on the filter, and this substance is always problematic in filtration operations.

Accordingly, it has been found advantageous to build an acid injection system into the filter chamber 30 to remove any calcium carbonate which has formed during the operation of the filter and which blocks the filter membrane 42. The introduction of fluoride ion will not remove calcium carbonate which has already formed and blocks the filter. In those instances, the filter must be cleared. The flow of the waste stream through filter chamber 30 is stopped by closing valves 28 and 58. Pump 26 is turned off. Any precipitate in the bottom of the precipitate collection zone 68 of the filter chamber 30 should be removed. Valve 38 is opened and acid is then introduced through inlet 36 to the clarified liquid collection zone 70 of filter chamber 30. Cold fresh water may also be introduced from a source through piping 64 and open valve 56. The dilute acid flows through the filter membrane 42 to the precipitate collection zone 68 and exits through outlet 66. Valve 50 is opened. The flow of acid and water through filter membrane 42 removes the calcium carbonate buildup. The acid and any solids must be carefully removed from the filter chamber 30 to prevent contamination of the precipitate. When the filter membrane is cleared, the normal operation of the treatment unit 100 can resume.

What is claimed is:

1. An electrolytic treatment unit comprising:

an electrolytic cell having at least one cathode chamber and at least one anode chamber separated by an anion exchange membrane;

means for applying electric current to said electrolytic cell;

a holding compartment fluidly connected to said cathode chamber;

a filter chamber fluidly connected to said holding compartment, said filter chamber having a filter membrane made of a porous tetrafluoruethylene polymeric material dividing said filter chamber into a precipitate collection zone and a clarified liquid zone;

a clarified liquid collection chamber having an inlet fluidly connected to said clarified liquid zone of said filter chamber, an outlet for discharging clarified liquid and means proximate said outlet to ensure discharge of only clarified liquid during operation of said unit; and pump means for directing the flow of unfiltered liquid from said holding compartment to said filter chamber and through said filter membrane.

2. The electrolytic treatment unit recited in claim 1 further comprising means for back-pulsing liquid through said filter membrane.

3. The electrolytic treatment unit recited in claim 1 wherein said electrolytic cell has some whole number multiple of an arrangement comprising two cathode chambers on opposing sides of one anode chamber and two anion exchange membranes, each positioned between one of said cathode chambers and said anode chamber.

4. The electrolytic treatment unit recited in claim 1 wherein said clarified liquid collection chamber has a second outlet fluidly connected to said holding compartment and said unit further comprises means to prevent unfiltered liquid from entering said collection chamber from said holding compartment.

5. The electrolytic treatment unit recited in claim 4 wherein said preventing means is a baffle.

6. The electrolytic treatment unit recited in claim 1 further comprising means for measuring the pH of the clarified liquid in said collection chamber and for communicating the pH measurements thus obtained to a controller for controlling the amount of current applied to said electrolytic cell.

7. The electrolytic treatment unit recited in claim 1 further comprising means for injecting treating agents into said filter chamber.

8. The electrolytic treatment unit recited in claim 1 wherein said anode chamber has an anode made of an alloy comprised of major amounts of iron and minor amounts of silicon.

9. The electrolytic treatment unit recited in claim 1 wherein said discharge ensuring means comprises an overflow weir surrounding said outlet and wherein said collection chamber is dimensioned so that a head of clarified liquid is maintained within said collection chamber behind said overflow weir so that only excess clarified liquid flows over said overflow weir to said outlet when said unit is in operation.

* * * * *

UNITED STATES PATENT AND TRADEMARK OFFICE
CERTIFICATE OF CORRECTION

PATENT NO. : 4,948,489

DATED : August 14, 1990

INVENTOR(S) : Bernard Greenberg and Andrew Sulner

It is certified that error appears in the above-identified patent and that said Letters Patent is hereby corrected as shown below:

Col. 6, line 40, after (2)] insert a space.

Col. 9, line 17, delete "6, x 5," and substitute therefor -- 6' X 5' --.

Signed and Sealed this

Ninth Day of June, 1992

Attest:

DOUGLAS B. COMER

*Attesting Officer*  *Acting Commissioner of Patents and Trademarks*